(12) United States Patent
Kolozsvari

(10) Patent No.: US 6,192,834 B1
(45) Date of Patent: Feb. 27, 2001

(54) COLLAPSIBLE CAGE

(75) Inventor: Kevin Kolozsvari, Arlington, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 0 days.

(21) Appl. No.: 09/248,161

(22) Filed: Feb. 10, 1999

(51) Int. Cl.[7] ................................................ A01K 1/03
(52) U.S. Cl. .......................... 119/498; 119/499; 119/474
(58) Field of Search .................................. 119/498, 499, 119/474, 461, 491, 497

(56) References Cited

U.S. PATENT DOCUMENTS

| | | | |
|---|---|---|---|
| 969,285 | * | 9/1910 | Keipper . |
| 1,187,875 | * | 6/1916 | Welty . |
| 1,198,524 | * | 9/1916 | Cunliffe . |
| 2,892,562 | * | 6/1959 | Smithson . |
| 3,556,058 | * | 1/1971 | Smiler . |
| 3,896,766 | * | 7/1975 | Martin ................................... 119/474 |
| 4,016,833 | * | 4/1977 | Ray ........................................ 119/498 |
| 4,762,085 | * | 8/1988 | Ondrasik .............................. 119/474 |
| 4,763,606 | * | 8/1988 | Ondrasik, II ........................ 119/474 |
| 5,549,073 | * | 8/1996 | Askins et al. ........................ 119/474 |
| 5,626,098 | * | 5/1997 | Askins et al. ........................ 119/474 |
| 5,669,331 | * | 9/1997 | Richmond ............................ 119/497 |
| 5,727,502 | * | 3/1998 | Askins et al. ........................ 119/499 |
| 5,943,982 | * | 8/1999 | Askins et al. ........................ 119/499 |

* cited by examiner

Primary Examiner—Peter M. Poon
Assistant Examiner—Yvonne R. Abbott
(74) Attorney, Agent, or Firm—Locke Liddell & Sapp LLP

(57) ABSTRACT

A collapsible cage for housing an animal having an expanded and a collapsed configuration. The collapsible cage comprises a top platform and a bottom platform defining the ceiling and floor of said collapsible cage, a first accordion wall, a second accordion wall, a first end wall, and a second end wall, which collectively define a cage interior when the collapsible cage is in an expanded configuration. The first end wall rotatably engages the bottom platform and the second end wall rotatably engages the top platform. The first accordion wall and second accordion wall each have a first upper portion and a first lower portion. The first upper portions have first upper ends rotatably attached to the top platform, and the first lower portions have first lower ends rotatably attached to the bottom platform. The first upper portions rotatably engage the first lower portions along a hinge intermediate of the first upper ends and the first lower ends. During the transition of the collapsible cage from the expanded configuration to the collapsed configuration, the first and second end walls and the first and second accordion walls pivot into the cage interior and the top platform approaches the bottom platform.

18 Claims, 7 Drawing Sheets

COLLAPSIBLE CAGE

FIELD OF THE INVENTION

This invention relates to animal cages. More particularly, this inventions relates to collapsible cages for pets.

BACKGROUND OF THE INVENTION

Though most pets, such as cats and dogs, enjoy permanent housing facilities in the homes or yards of their owners, other temporary housing facilities are also occasionally required. Temporary housing facilities may be needed to isolate a pet during specific occasions, such as during yard work or the entry of visitors into a home. Temporary housing facilities may also be needed to accommodate a pet separated from its normal environs, or to serve as a carrier in which the pet may be transported from place to place. The size of temporary housing facilities appropriate for such purposes, and the corresponding difficulty in storing such temporary housing facilities, may discourage the retention of temporary housing facilities beyond the specific occasion for which they were purchased. In response to the high cost and waste associated with the replacement of temporary housing facilities so disposed of, a number of cages capable of being collapsed to a smaller size for easy storage were developed. These include U.S. Pat. No. 5,669,331 to Richmond, and U.S. Pat. No. 4,484,540 to Yamamoto, among others.

However, despite the storage advantages such previous collapsible cages have presented over their larger and bulkier non-collapsible brethren, significant deficiencies still remained. Specifically, the transition of previous cages from a collapsed to an expanded state, or the reverse transition, has proved difficult to achieve, especially when attempted by a single individual (who may be simultaneously attempting to control a distressed and highly uncooperative pet). In addition, the manner in which previous cages transitioned from an expanded to a collapsed state has limited the reduction in cage size achievable through the transition. A need exists for an improved collapsible cage that addresses these deficiencies.

SUMMARY OF THE INVENTION

The present invention provides a collapsible cage for housing an animal. The collapsible cage has an expanded and a collapsed configuration. The collapsible cage comprises a top platform and a bottom platform defining the ceiling and floor of said collapsible cage, a first accordion wall, a second accordion wall, a first end wall, and a second end wall, which collectively define a cage interior when the collapsible cage is in an expanded configuration. The first end wall rotatably engages the bottom platform and the second end wall rotatably engages the top platform.

The first accordion wall has a first upper portion and a first lower portion. The first upper portion has a first upper end rotatably engaged to the top platform, and the first lower portion has a first lower end rotatably engaged to the bottom platform. The first upper portion rotatably engages the first lower portion along a hinge intermediate of the first upper end and the first lower end.

The second accordion wall has a second upper portion and a second lower portion. The second upper portion has a second upper end rotatably engaged to the top platform, and the second lower portion has a second lower end rotatably engaged to the bottom platform. The second upper portion rotatably engages the second lower portion along a hinge intermediate of the second upper end and the second lower end.

During the transition of the collapsible cage from the expanded configuration to the collapsed configuration, the first and second end walls and the first and second accordion walls pivot into the cage interior and the top platform approaches the bottom platform.

The rotatable engagement of the first end wall to an individual one of the top or bottom platforms, combined with the rotatable engagement of the second end wall to the other of the top or bottom platforms, advantageously reduces the need to manually position both end walls during the transformation of the collapsible cage into either an expanded or collapsed configuration, and may also reduce the size of the collapsible cage within the collapsed configuration. This reduction in the size of the collapsed cage within the collapsed configuration is aided by the need for each of the top and bottom platforms to accommodate only an individual one of the end walls between itself and the collapsed accordion walls. Collapsible cages having both end walls attached to an individual one of the top or bottom platforms, by contrast, must necessarily accommodate both end walls between that individual one of the top and bottom platforms and the accordion walls within the collapsed configuration.

BRIEF DESCRIPTION OF THE DRAWINGS

The objects and advantages of the present invention described above will be more clearly understood when considered in conjunction with the accompanying drawings, in which.

DETAILED DESCRIPTION OF THE PREFERRED EMBODIMENTS

Figure 1:
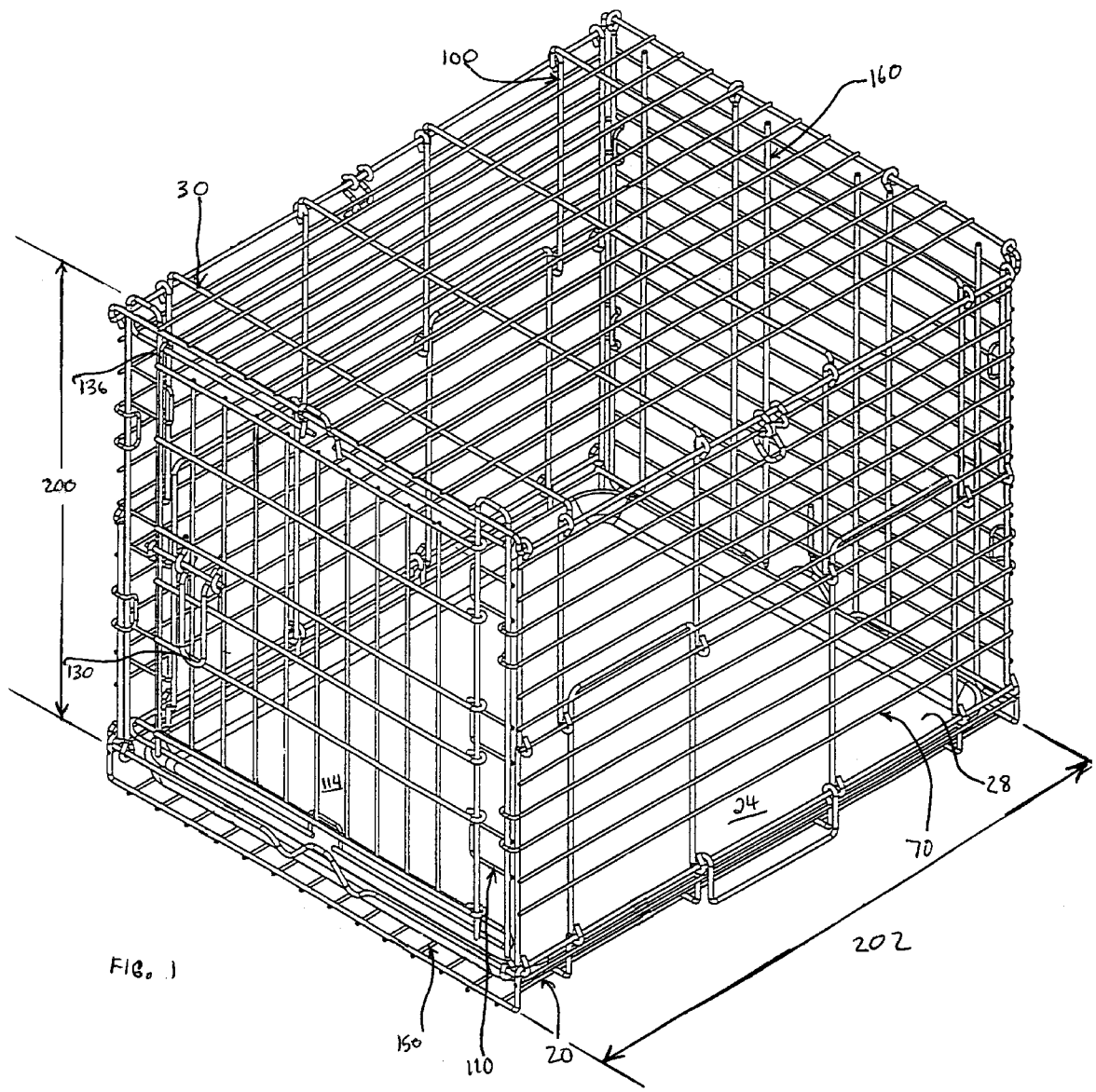
FIG. 1 is a forward perspective view of a collapsible cage of the present invention.

FIG. 1 provides a forward perspective view of a collapsible cage 20 of the present invention in an expanded configuration. Cage 20 is capable of transforming from the expanded configuration illustrated to a collapsed configuration illustrated in FIG. 6 for convenient transportation or storage of cage 20. Cage 20 comprises a top platform 30, a bottom platform 50, a first accordion wall 70, a second accordion wall 100, a forward end wall 110, and a rear end wall 160. Platforms 30 and 50 and walls 70, 100, 110, and 160 are each of a wire-frame construction and are substantially rectangular in shape, and together define a cage interior 24. Though cage 20 is illustrated as having wireframe construction, it should be understood that cage 20 could also be constructed from other materials, such as molded plastic or aluminum sheeting. In the expanded configuration illustrated, top platform 30 and bottom platform 50, first accordion wall 70 and second accordion wall 100, and forward end wall 110 and rear end wall 160, each form opposite parallel walls of a rectangular cube, wherein each wall or platform comprising a side of the rectangular cube defines a plane perpendicular to those planes defined by adjacent walls and platforms. This expanded configuration permits housing of an animal within cage 20. Subsequent reference to cage 20, top platform 30, bottom platform 50, first accordion wall 70, second accordion wall 100, forward end wall 110, or rear end wall 160, as "expanded" or in an "expanded configuration" shall indicate a position and orientation consistent with that illustrated in FIG. 1. A floor tray 28 within cage interior 24 substantially overlays bottom platform 50.

First accordion wall 70 and second accordion wall 100 each rotatably engage both top platform 30 and bottom platform 50. A rotatable engagement is engagement which permits at least some degree of rotating or pivoting of one or both of the engaged members about an axis defined or controlled by the points of engagement. Forward end wall 110 rotatably engages bottom platform 50, while and rear end wall 160 rotatably engages top platform 30. Forward end wall 110 comprises a door frame 112 defining an entryway 114, and a door 120 rotatably engaging door frame 112. A latch 130 and a locking hook 136 secure door 120 to door frame 112 in a closed position.

Figure 2:
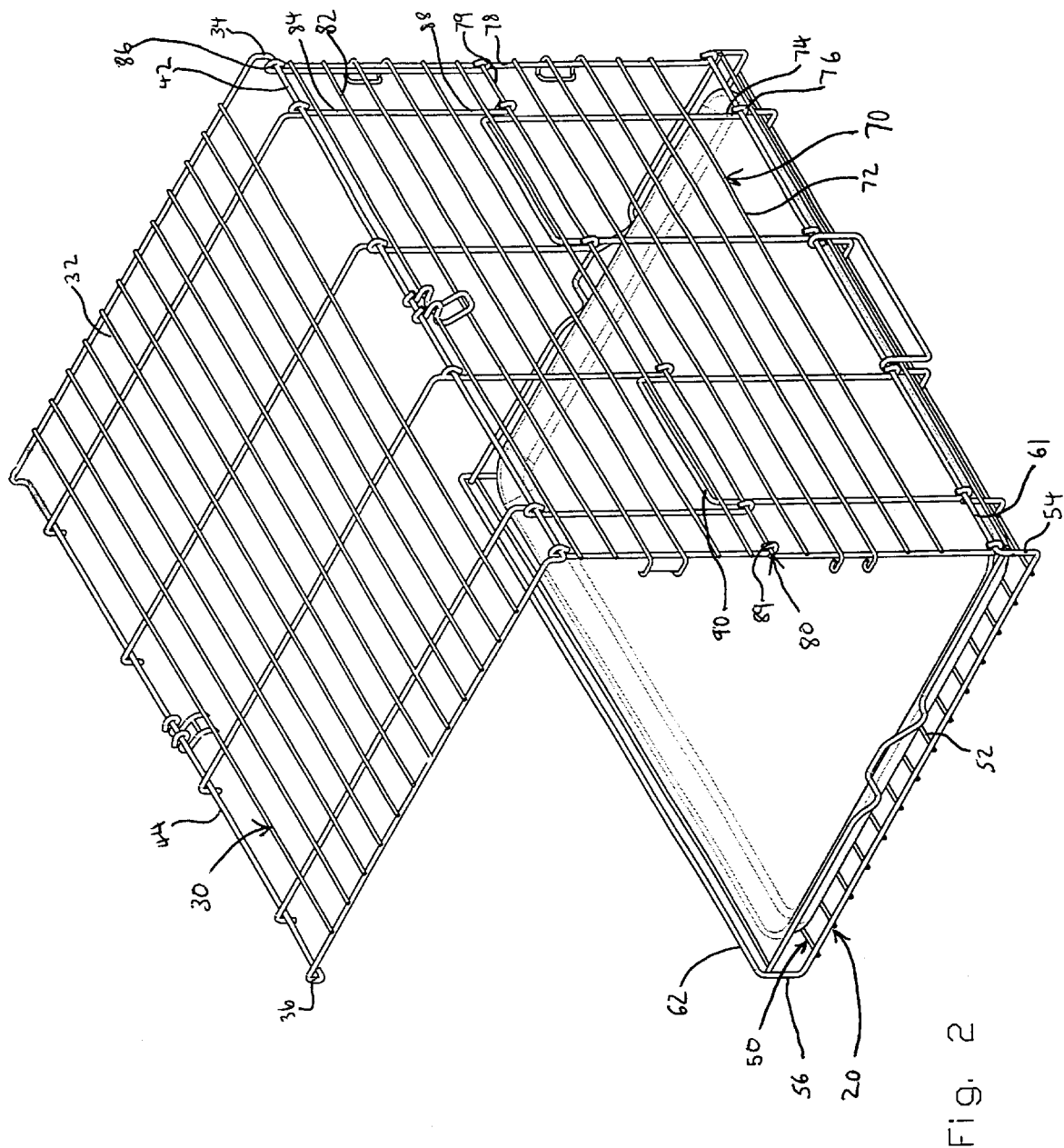
FIG. 2 is a forward perspective view of the top platform, bottom platform, and first accordion wall of the collapsible cage of FIG. 1.

FIG. 2 provides a forward perspective view of cage 20 of FIG. 1 in an expanded configuration, wherein second accordion wall 100, forward end wall 110, and rear end wall 160 have been removed for clarity of illustration. Top platform 30 and bottom platform 50 respectively define the ceiling and floor of cage 20. Top platform 30 comprises a substantially planar main top section 32, a first upper lip 34 and a second upper lip 36. First upper lip 34 and second upper lip 36 extend from opposite ends of main top section 32 toward bottom platform 50, in a direction substantially perpendicular to the plane defined by main top section 32, and terminate in wires 42 and 44 respectively.

Similarly, bottom platform 50 comprises a substantially planar main bottom section 52, a first lower lip 54 and a second lower lip 56. First lower lip 54 and second lower lip 56 extend from opposite ends of main bottom section 52 toward top platform 30, in a direction substantially perpendicular to the plane defined by main bottom section 52, and terminate in wires 61 and 62 respectively.

First accordion wall 70 comprises a lower portion 72 and an upper portion 82, both of which are substantially planar and rectangular in configuration. In the expanded configuration of cage 20 upper portion 82 and lower portion 72 define a single plane substantially perpendicular to the planes defined by main bottom section 52 and main top section 32. Lower portion 72 has a lower end 74 terminating in a plurality of wire loops 76 and an opposite inner wire end 78 terminating in an wire 79. Wire loops 76 substantially encircle wire 61 and thereby rotatably engage lower portion 72 to first lower lip 54 of bottom platform 50.

Wire loops similar to wire loops 76 are utilized throughout the construction of cage 20. However, it should be understood that means other than wire loops may also be utilized to rotatably engage components of cage 20 to one another. Other acceptable methods of rotatably engaging components include, but are not limited to, separate collars or more traditional separate hinge arrangements.

Upper portion 82 has an upper end 84 terminating in a plurality of wire loops 86 and an opposite inner loop end 88 terminating in a plurality of wire loops 89. Wire loops 86 substantially encircle wire 42 and thereby rotatably engage upper portion 82 to first upper lip 34 of top platform 30. Wire loops 89 substantially encircle wire 79 and thereby form a hinge 80 and rotatably engage lower portion 72 to upper portion 82. Hinge 80 is therefore located intermediate of upper end 84 and lower end 74 of first accordion wall 70. "Intermediate" in this sense should be understood to mean at any point between upper end 84 and lower end 74, though hinge 80 is preferably located substantially midway between wire loops 76 and wire loops 86.

A plurality of accordion wall stops 90 extend from lower portion 72 toward top platform 30, and between cage interior 24 and upper portion 82. In the expanded configuration of cage 20, accordion wall stops 90 prevent upper portion 82 from pivoting about hinge 80 substantially toward cage interior 24.

Second accordion wall 100 (not illustrated in FIG. 2) substantially mirrors the construction of first accordion wall 70, and engages top platform 30 and bottom platform 50 in a manner substantially similar to that in which first accordion wall 70 engages platforms 30 and 50.

Figure 3:
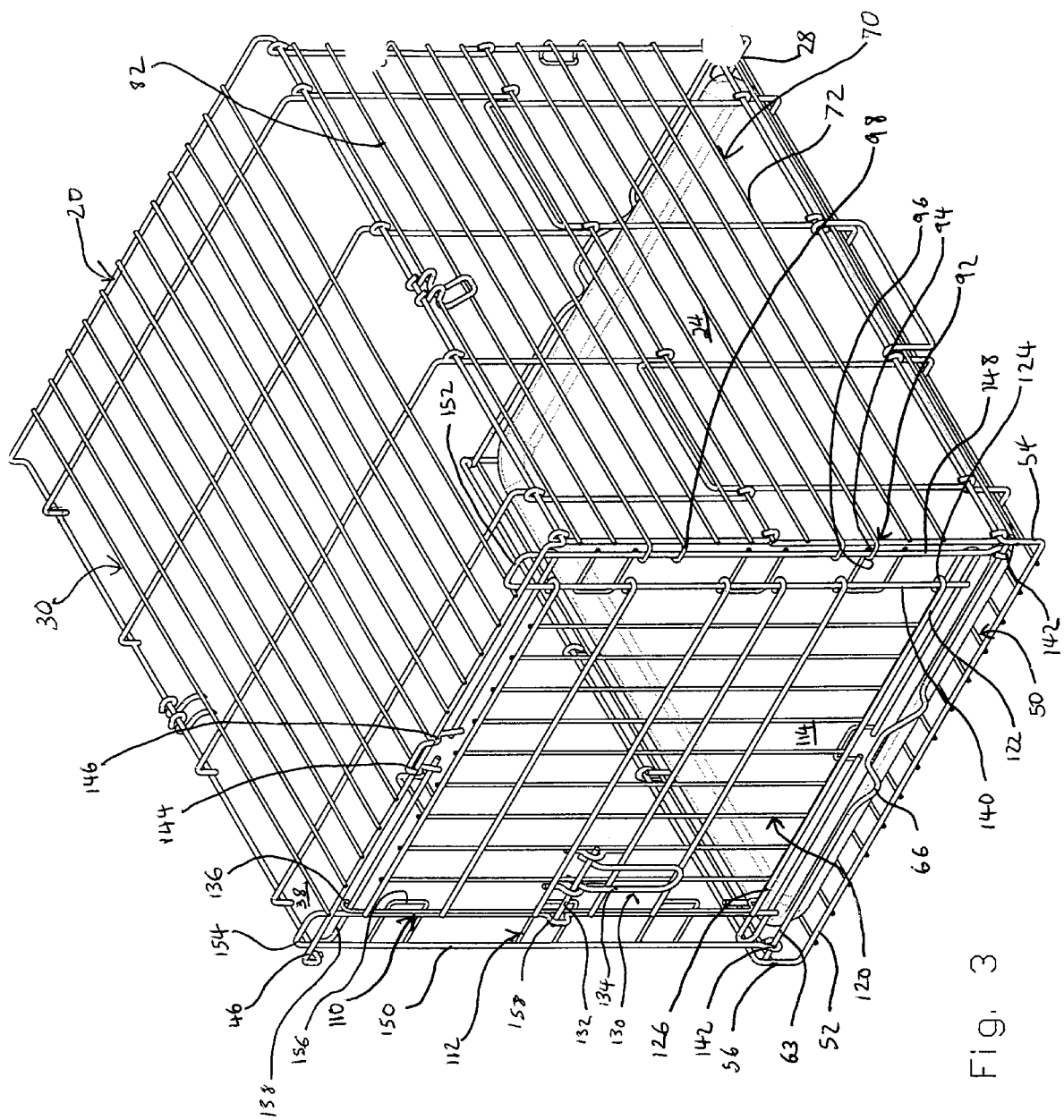
FIG. 3 is a forward perspective view of the top platform, bottom platform, first accordion wall, and forward end wall of the collapsible cage of FIG. 1.

FIG. 3 provides a forward perspective view of cage 20 of FIG. 1 in an expanded configuration, wherein second accordion wall 70 and rear end wall 160 have been removed for clarity of illustration. Bottom platform 50 has a tray wire 63 extending from first lower lip 54 to second lower lip 56 adjacent to forward end wall 110. Tray wire 63 includes two tray projections 66 extending substantially toward main bottom section 52. Tray projections 66 prevent the accidental removal of floor tray 28 from the cage interior 24. Preferably, tray wire 63 is sufficiently flexible to allow movement of tray wire 63 away from main bottom section 52 under ordinary hand pressure, thereby permitting intentional removal of floor tray 28 from cage interior 24 between tray wire 63 and main bottom section 52.

Door frame 112 of forward end wall 110 has an edge wire 148 adjacent to first accordion wall 70 and an edge wire 150 opposite second accordion wall 70. Edge wires 148 and 150 terminate in wire loops 142. Wire loops 142 substantially encircle tray wire 63 and thereby rotatably engage door frame 112 of forward end wall 110 to bottom platform 50.

Several mechanisms help ensure that, from the expanded configuration of cage 20, forward end wall 110 may only pivot about tray wire 63 inwardly toward cage interior 24. End stop 92 comprises perpendicular extension 94 and parallel extension 96. Perpendicular extension 94 extends from lower portion 72 adjacent forward end wall 110 toward cage interior 24, in a direction substantially perpendicular to the plane defined by lower portion 72. The length of perpendicular extension 94 should be sufficient to permit perpendicular extension 94 to extend immediately beyond edge wire 148 when cage 20 is in an expanded configuration. Parallel extension 96 extends, from the end of perpendicular extension 94 opposite lower portion 72, in a direction substantially parallel to the plane defined by lower portion 72, and toward cage interior 24.

Perpendicular extension 94 ensures that forward end wall 110 may only pivot inwardly toward cage interior 24 from an expanded configuration. In an alternate embodiment parallel extension 96 also frictionally engages edge wire 148 and thereby assists in the maintenance of forward end wall 110 in an expanded configuration. In an alternate embodiment not illustrated in FIG. 3, parallel extension 96 extends both toward cage interior 24 and toward lower portion 72 to enhance the strength of the engagement between parallel extension 96 and edge wire 148. End stop 98 extends from upper portion 82 in a manner similar to that in which end stop 92 extends from lower portion 72, and performs similar functions to those performed by end stop 92. Two end stops extend from second accordion wall 100 (not illustrated in FIG. 3) in a manner similar to that in which end stops 92 and 98 extend from first accordion wall 70, and also perform similar functions to those performed by end stop 92.

Top stops 152 and 154 extend from the end of door frame 112 opposite wire loops 142, in a direction away from wire loops 142 and substantially parallel to the plane defined by door frame 112. As illustrated in FIG. 3, top stops 152 and 154 are formed by edge wires 148 and 150 respectively. In the expanded configuration of cage 20, top stops 152 and 154 contact a end wire 46 of top platform 30 and thereby prevent the pivoting of forward end wall 110 away from cage interior 24 from the expanded configuration. The presence of gaps 38 in the wire-frame construction of top platform 30, through which top stops 152 and 154 may pivot, ensures that top stops 152 and 154 do not prevent the pivoting of forward end wall 110 into cage interior 24 from the expanded configuration.

A locking tongue 144 also extends from the end of door frame 112 opposite wire loops 142, in a direction substantially parallel to the plane defined by door frame 112 and away from wire loops 142. In the expanded configuration of cage 20, locking tongue 144 contacts a side of end wire 46 substantially opposite the side of end wire 46 contacted by top stops 152 and 154. End wire 46 is thereby locked in position between locking tongue 144 and top stops 152 and 154, and substantially any pivoting of forward end wall 110 either toward or away from cage interior 24 is prevented. To facilitate this locking while preventing unwanted bending of either door frame 112 or end wire 46, locking tongue 144 incorporates an outward extension 146. Outward extension 146 creates a gap between locking tongue 144 and the plane defined by top stops 152 and 154, measured perpendicular to the plane defined forward end wall 110, that is capable of receiving end wire 46.

Door frame 112 defines substantially rectangular entryway 114. A hinge wire 140 of door frame 112 is oriented substantially parallel to edge wires 148 and 150. Substantially rectangular door 120 has a hinge end 122 and a latch end 126. Hinge end 122 terminates in a plurality of wire loops 124. Wire loops 124 substantially encircle hinge wire 140 and thereby rotatably engage door 120 to door frame 112.

Latch end 126 includes latch 130. Latch 130 operates by removably inserting a latch pin 132 into a receiving loop 158 extending from door frame 112. Removable insertion of latch pin 132 is achieved by pivoting latch handle 134 toward top stops 152 and 154, moving latch handle 134 toward receiving loop 158, and then lowering latch handle 134 to lock latch pin 132 in place. Six door stops 156 extend from door frame 112 into entryway 114 in a direction parallel to the plane defined by door frame 112. Door stops 156 prevent door 120 from pivoting about hinge wire 140 into cage interior 24.

A locking hook 136 extends from door 120 adjacent to latch end 126. In an expanded configuration, locking hook 136 extends upward in the plane defined by door 120 toward and partly around a hook wire 138 of door frame 112. Door 120 rotatably engages door frame 112 in a manner permitting sufficient movement of door 120 parallel to hinge wire 140 to allow locking hook 136 to be lifted over and then engage hook wire 138 during closing of door 120.

Figure 3A:
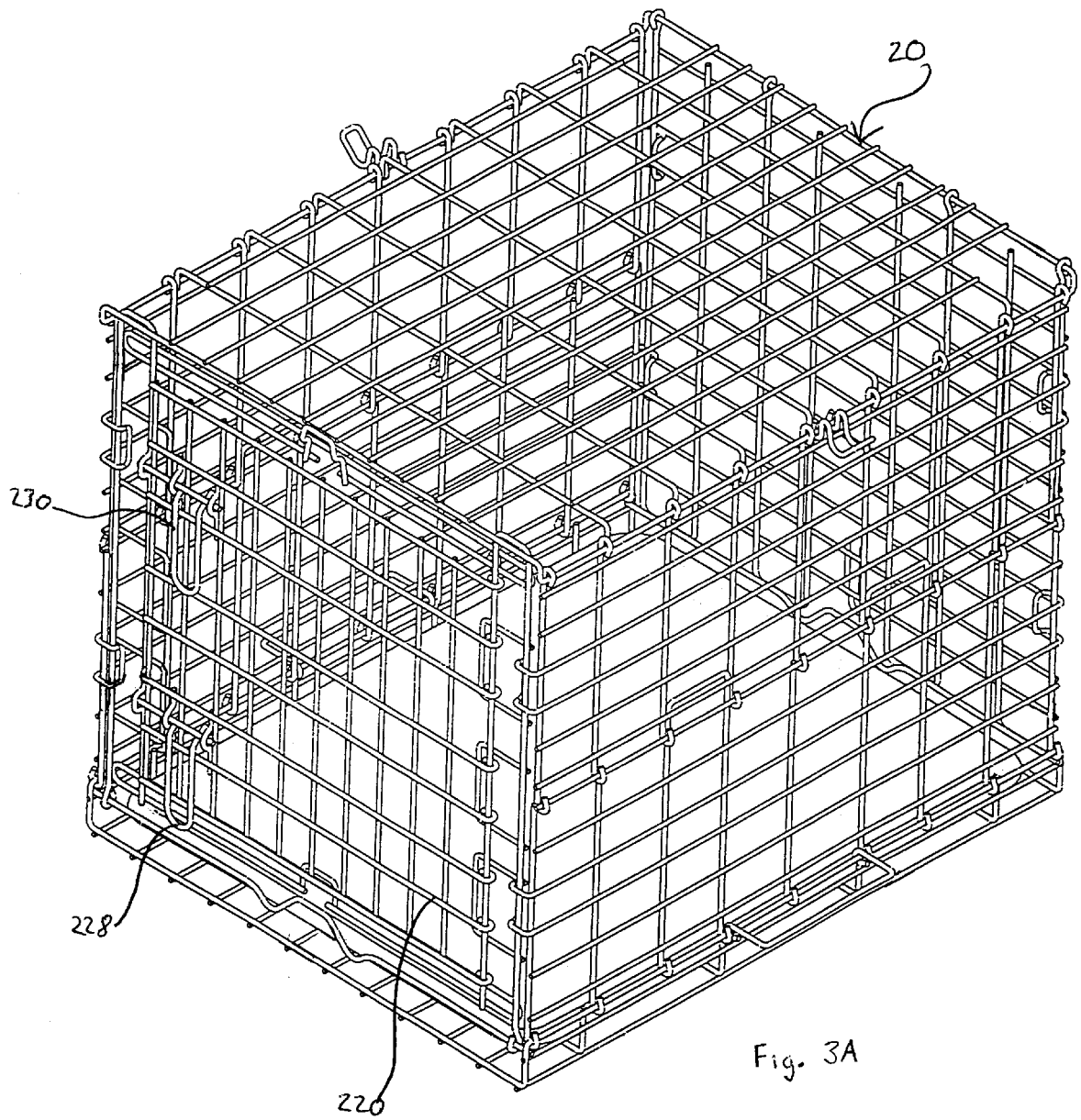
FIG. 3A is a forward perspective view of an alternate embodiment of the collapsible cage of FIG. 1 wherein two latches are utilized to maintain the cage door in a closed position.

FIG. 3A illustrates an alternate embodiment of cage 20 wherein door 220 incorporates a lower latch 228 and an upper latch 230, but does not incorporate a locking hook. The use of multiple latches 228 and 230 advantageously allows for a more secure closure of door 220, and prevents accidental opening of door 220 upon failure of any one latch 228 or 230. It should be understood that cage 20 may incorporate alternate types of door fasteners other than the illustrated latches 130, 228, or 230. Acceptable alternative door fasteners include, but are not limited to, spring loaded wire hooks, cantilevered clips, or even old fashioned gate latches.

Figure 4:
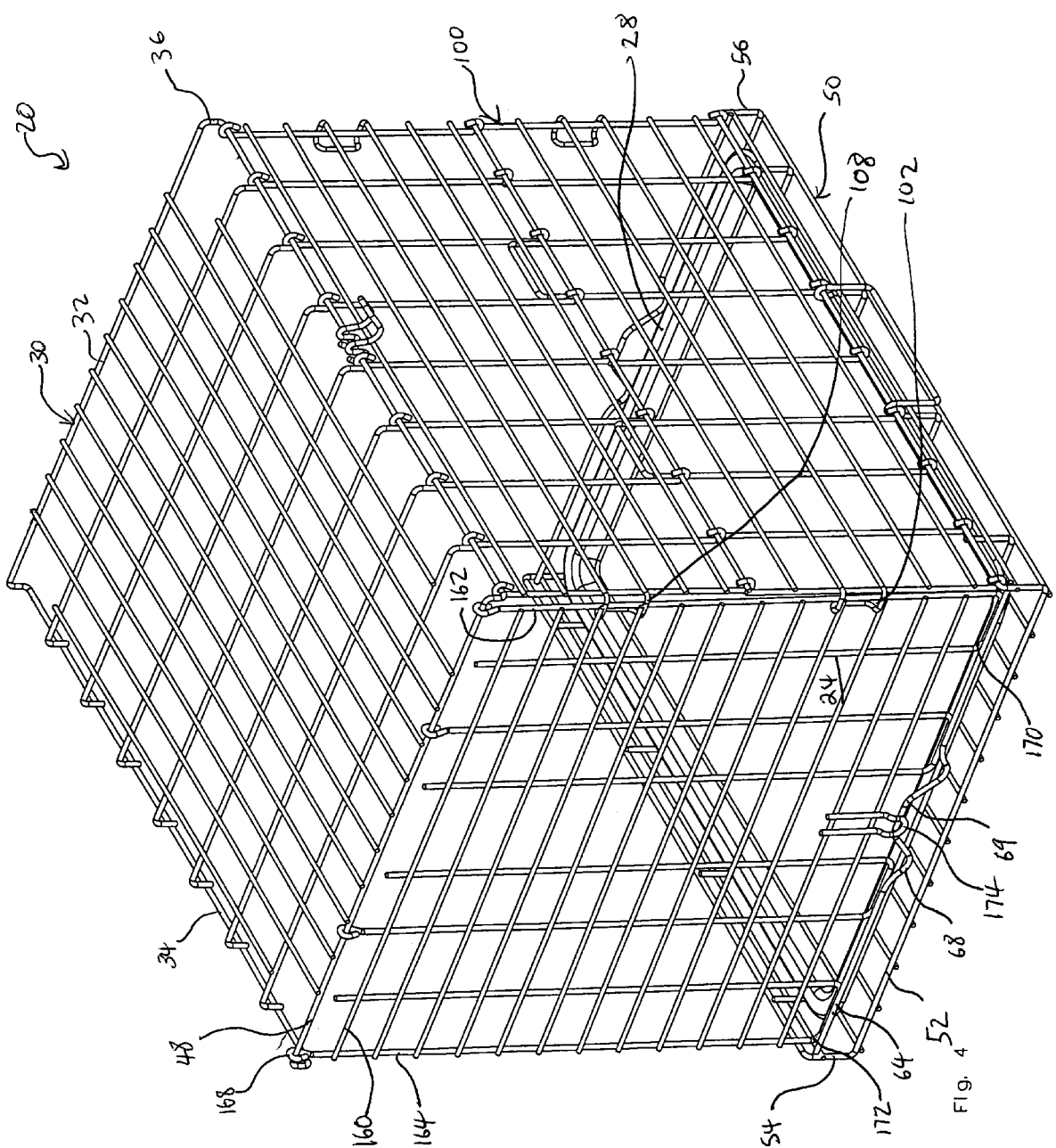
FIG. 4 is a rear perspective view of the top platform, bottom platform, first accordion wall, and rear end wall of the collapsible cage of FIG. 1.

FIG. 4 provides a rear perspective view of cage 20 of FIG. 1 in an expanded configuration, wherein first accordion wall 70 and forward end wall 110 have been removed for clarity of illustration. Top platform 30 has an end wire 48 extending across main top section 32 from first upper lip 34 to second upper lip 36 adjacent rear end wall 160. Rear end wall 160 has an edge wire 162 adjacent to second accordion wall 100, and an edge wire 164 opposite second accordion wall 100. Edge wires 162 and 164 terminate in wire loops 168. Wire loops 168 substantially encircle end wire 48 and thereby rotatably engage rear end wall 160 to top platform 30.

End stops 102 and 108 extend from second accordion wall 100 in a manner similar to that in which end stops 92 and 98 extend from first accordion wall 70 (as illustrated in FIG. 3). End stops 102 and 108 also serve functions similar to those served by end stops 92 and 98. Specifically, end stops 102 and 108 ensure that rear end wall 160 may only pivot inwardly toward cage interior 24 from the expanded configuration. In an alternate embodiment end stops 102 and 108 may also frictionally engage edge wire 162 to assist in the maintenance of rear end wall 160 and cage 20 in the expanded configuration. Two stops extend from first accordion wall 70 (not illustrated in FIG. 4) in a manner similar to that in which end stops 102 and 108 extend from second accordion wall 100, and perform similar functions to those performed by end stops 102 and 108.

Bottom stops 170 and 172 extend from rear end wall 160 opposite wire loops 168, in a direction substantially parallel to the plane defined by rear end wall 160, and away from wire loops 168. As illustrated in FIG. 4, bottom stops 170 and 172 are formed by edge wires 162 and 164 respectively. In the expanded configuration of cage 20, bottom stops 170 and 172 contact a tray wire 64 of bottom platform 50 and thereby prevent the pivoting of rear end wall 160 away from cage interior 24 from an expanded configuration. A locking tongue 174 also extends from the rear end wall 160 opposite wire loops 168, in a direction substantially parallel to the plane defined by rear end wall 160, and way from wire loops 168. In the expanded configuration of cage 20, locking tongue 174 contacts a side of tray wire 64 substantially opposite the side of tray wire 64 contacted by bottom stops 170 and 172. Tray wire 64 is thereby locked in position between locking tongue 174 and bottom stops 170 and 172, and substantially any pivoting of rear end wall 160 either toward or away from cage interior 24 is prevented. To facilitate this locking while preventing unwanted bending of either rear end wall 160 or tray wire 64, locking tongue 174 may incorporate an outward extension similar to outward extension 146 of locking tongue 144, to create a gap capable of receiving tray wire 64 between locking tongue 174 and the plane defined by bottom stops 170 and 172.

Tray wire 64 extends from first lower lip 54 and second lower lip 56 adjacent to rear end wall 160. Tray wire 64 is configured to include two tray projections 68 extending substantially toward main bottom section 52 to prevent the accidental removal of floor tray 28 from the cage interior 24. Tray wire 64 is similarly configured to include a locking projection 69 extending away from main bottom section 52, and along which locking tongue 174 contacts tray wire 64. The locking of tray wire 64 between locking tongue 174 and bottom stops 170 and 172, as well as the locking of end wire 46 between locking tongue 144 and top stops 152 and 154, assist in the maintenance of cage 20 in an expanded configuration.

Referring now to FIGS. 1, 2, 3, and 4, the transition of cage 20 from an expanded configuration to a collapsed configuration is begun by extricating end wire 46 from between locking tongue 144 and top stops 152 and 154, and tray wire 64 from between locking tongue 174 and bottom stops 170 and 172. The extrication of end wire 46 may be accomplished by pulling door frame 112 and main top section 32 adjacent forward end wall I 10 away from one another, and then pivoting forward end wall 110 about tray wire 63 toward cage interior 24. The extrication of tray wire 64 may be accomplished by pulling rear end wall 160 and main bottom section 52 away from one another, and then pivoting rear end wall 160 about end wire 48 toward cage interior 24. The extrication of tray wire 64 and end wire 46 is facilitated by the flexibility of the wire frame construction utilized in main top section 32 and main bottom section 52.

In an alternate embodiment, the initiation of pivoting of forward end wall 110 and rear end wall 160 will require the application of forces sufficient to overcome a frictional engagement between forward and rear end walls 110 and 160 and the ends stops (including end stops 92, 98, 102, and 108) extending from first and second accordion walls 70 and 100. Top platform 30 and bottom platform 50 may be moved toward one another upon the removal of forward end wall 110 and rear end wall 160 as barriers separating top platform 30 from bottom platform 50. Top platform 30 will preferably naturally collapse upon bottom platform 50 under the influence of gravity if cage 20 is oriented with bottom platform 50 toward the ground. Any significant movement of top platform 30 toward bottom platform 50 will result in the folding of first accordion wall 70 along hinge 80, whereby upper end 84 and lower end 74 move toward one another, and hinge 80 moves toward cage interior 24. Second accordion wall 100 folds in a manner similar to and substantially simultaneous with the folding of first accordion wall 70. Before significant movement of top platform 30 toward bottom platform 50 is initiated, the pivoting of rear end wall 160 into cage interior 24 should be sufficient so that bottom stops 170 and 172 have cleared a plane parallel to main top section 32 and passing through hinge 80, so as to prevent interference between the inward pivoting of rear end wall 160 and the folding of accordion walls 70 and 100.

Figure 5:
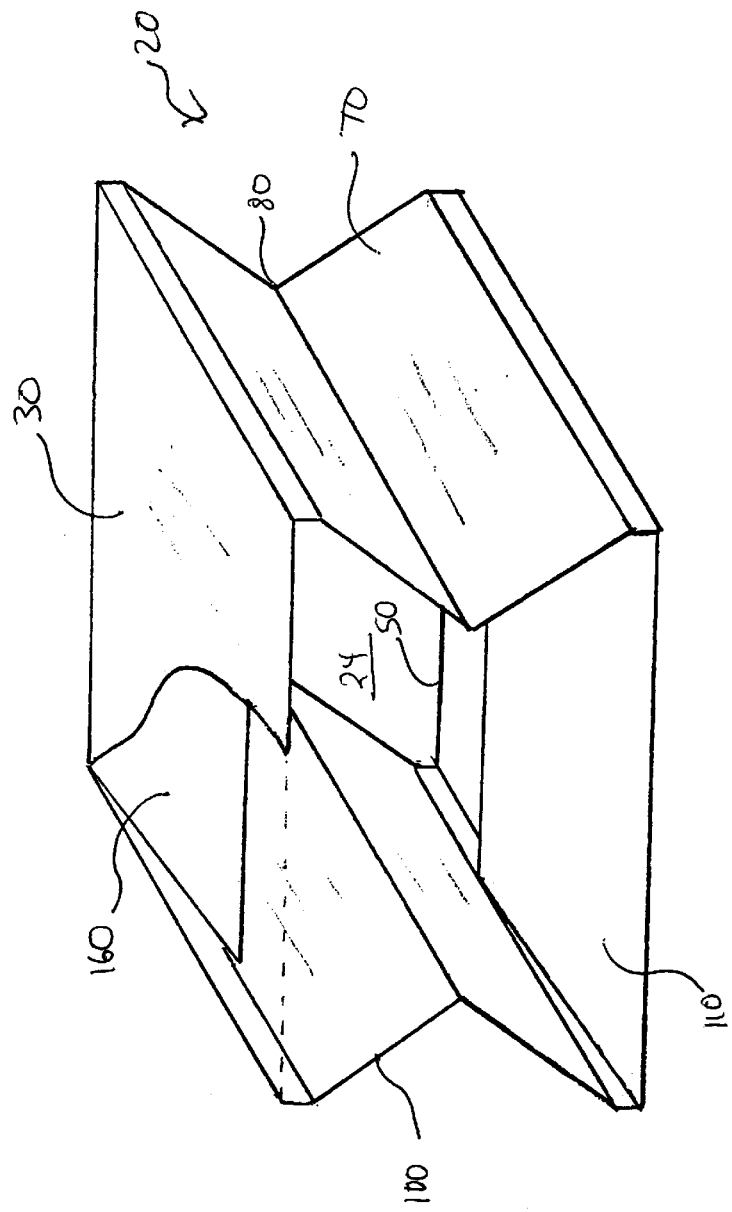
FIG. 5 is a forward perspective view of a simplified cage 20 illustrating the collapsible cage of FIG. 1 during transformation between expanded and collapsed configurations.

FIG. 5 provides a simplified forward perspective view of cage 20 during the transition from an expanded configuration to a collapsed configuration. Top platform 30 has moved toward bottom platform 50, causing first and second accordion walls 70 and 100 to fold and hinge 80 to move into cage interior 24. Forward end wall 110 has pivoted into cage interior 24 and is disposed between bottom platform 50 and partially folded first and second accordion walls 70 and 100. Similarly, rear end wall 160 has pivoted into cage interior 24 and is disposed between top platform 30 (part of which is cut away to permit viewing of rear end wall 160) and partially folded first and second accordion walls 70 and 100.

Figure 6:
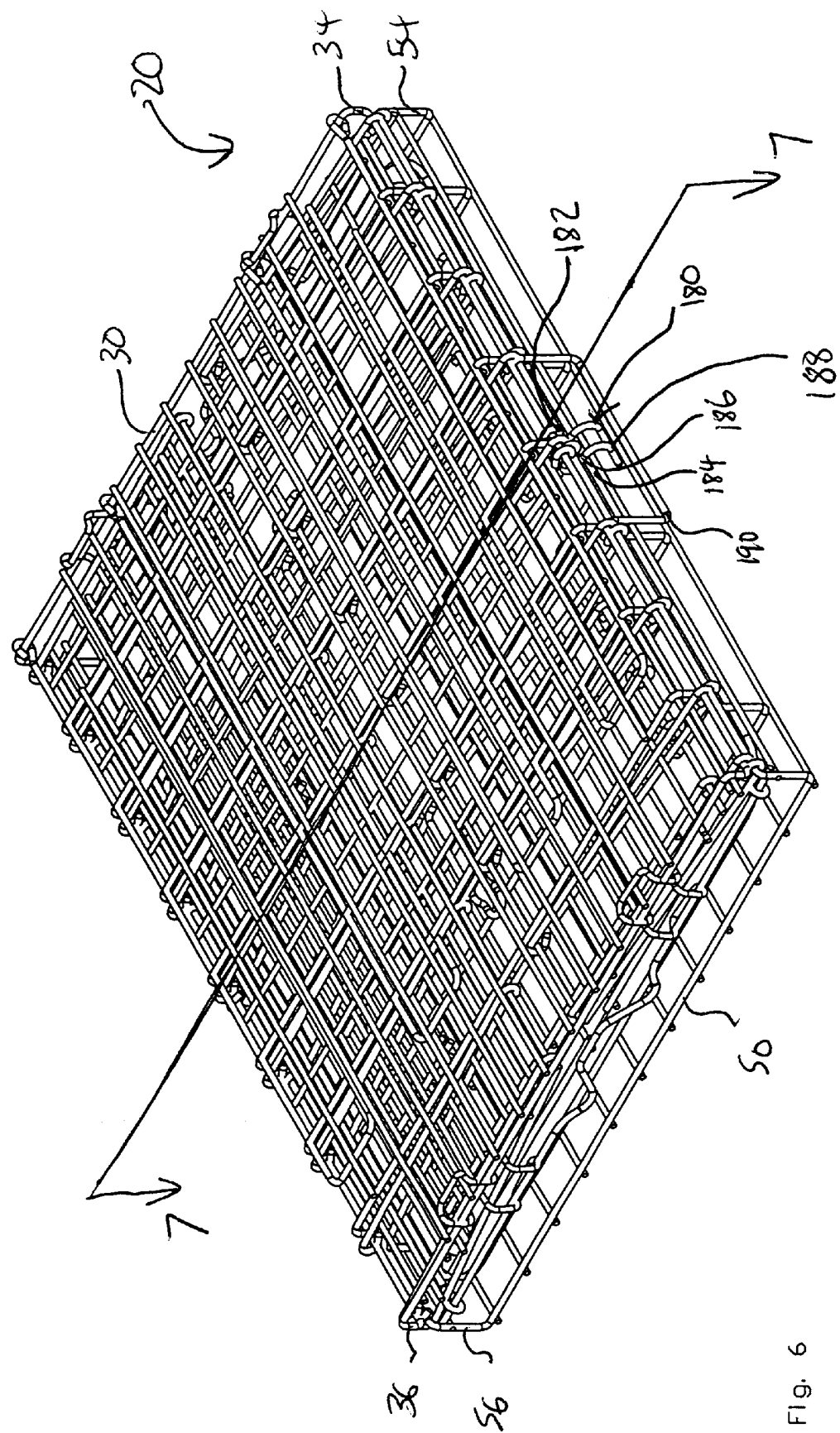
FIG. 6 is a forward perspective view of the collapsible cage of FIG. 1 in a collapsed configuration.

FIG. 6 provides a forward perspective view of cage 20 in a collapsed configuration. In the collapsed configuration of cage 20, first upper lip 34 abuts first lower lip 54, and second upper lip 36 abuts second lower lip 56. Cage 20 may be maintained in a collapsed state through the use of clips 180 rotatably engaged to first upper lip 34 and second upper lip 36. In the collapsed configuration, clips 180 may pivot downward and removably engage first and second lower lips 54 and 56. As illustrated, clips 180 rotatably engage upper lips 34 and 36 through clip loops 182, and removably engage lower lips 54 and 56 through slots 184 configured to accept clip wires 186 of clips 180. Clips 180 have tabs 188 to provide leverage for disengaging slots 184 from clip wires 186. A handle 190 rotatably attached to first lower lip 54 facilitates hand transport of cage 20 in the collapsed configuration.

Figure 7:
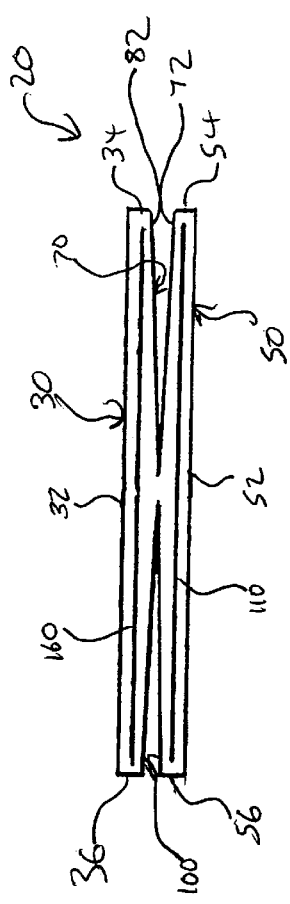
FIG. 7 is a simplified forward cross-sectional view of the collapsible cage of FIG. 1 taken along line 7—7 of FIG. 6.

FIG. 7 provides a forward cross-sectional view taken along line 7—7 of FIG. 6, perpendicular to main top section 32 and approximately half-way between the engagement forward end wall 110 and bottom platform 50, and the engagement of rear end wall 160 and top platform 30. The planes defined by upper portion 82 and lower portion 72 of first accordion wall 70 (and the corresponding components of second accordion wall 100) are immediately adjacent to one another and substantially parallel to the planes defined by main to portion 32 and main bottom portion 52. Forward end wall 110 is disposed between first lower lip 54 and second lower lip 56, and between lower portion 72 (and the corresponding lower portion of second accordion wall 100) and main bottom section 52. Rear end wall 160 is disposed between first upper lip 34 and second upper lip 36, and between upper portion 82 (and the corresponding upper portion of second accordion wall 100) and main top section 32.

The appearance of both forward end wall 110 and rear and wall 160 within the cross-sectional view of FIG. 7 indicates that in the collapsed configuration of cage 20, rear end wall 160 overlaps forward end wall 110. Similar overlapping will occur in any collapsible cage having end walls of a height 200 greater than half the length 202 of cage 20 (height 200 and length 202 are illustrated in FIG. 1).

Prior art collapsible cage designs, like the collapsible cage of the instant invention, have utilized two non-accordion end walls hinged to top or bottom platforms. However, the prior art has only disclosed and taught the rotatable attachment of non-accordion end walls to a single one of the top or bottom platforms of a collapsible cage.

For example, U.S. Pat. No. 5,626,098, issued May 6, 1997 to Askins, et al., discloses a collapsible cage having an two end walls, each of which is hinged to the collapsible cage's bottom platform. Similarly, U.S. Pat. No. 5,727,502, issued Mar. 17, 1998, to Askins, et al., discloses a collapsible cage having two end walls, each of which is hinged to the collapsible cage's bottom platform. Such a design facilitates transformation of the cage into a collapsed configuration, as both end walls may naturally pivot into the cage's interior under the influence of gravity without a need for substantial manual positioning. However, transformation of cages utilizing such a design into an expanded configuration requires manual positioning of both end walls while raising the cage's top platform.

U.S. Pat. No. 5,669,331, issued Sep. 23, 1997 to Richmond, discloses an animal carrier having two side walls (non-accordion end walls), each of which is pivotably coupled to the bottom of the top platform. Such a design facilitates transformation of the cage into an expanded configuration, as both end walls may naturally pivot out of the cage's interior and into a substantially vertical alignment without a need for substantial manual positioning. However, significant difficulty may be encountered in transforming cages utilizing such a design into a collapsed configuration, as both end walls must be pivoted upward and into the cage interior prior to lowering the top platform toward the bottom platform.

Cage 20 advantageously reduces the need to manually position both end walls 110 and 160 during the transformation of cage 20 into either an expanded or collapsed configuration. During transformation to a collapsed configuration, for example, forward end wall 110 should require little impetus to pivot into cage interior 24 once disengaged from end wire 46. The presence of door 120 in forward end wall 110 provides additional mass to forward end wall 110 and promotes the pivoting of forward end wall 1.00 into cage interior 24. Similarly, during transformation to an expanded configuration, rear end wall 160 should require little impetus to pivot out of cage interior 24 once top platform 30 is raised away from bottom platform 50. While forward end wall 10 may require substantial manual positioning during transformation of cage 20 into an expanded configuration, and rear end wall 160 may require substantial manual positioning during transformation of cage 20 into a collapsed configuration, the collapsible cage design of the instant invention advantageously avoids the need for substantial manual positioning of both end walls 110 and 160 during either transformation.

The collapsible cage design of the instant invention may also reduce the size of cage 20 within the collapsed configuration. This reduction in the size of cage 20 within the collapsed configuration is aided by the need for each of top and bottom platforms 30 and 50 to accommodate only an individual one of end walls 110 and 160 between itself and collapsed accordion walls 110 and 160. Collapsible cages having both end walls attached to an individual one of the top or bottom platforms, by contrast, must necessarily accommodate both end walls between that individual one of the top and bottom platforms and the accordion walls within the collapsed configuration.

U.S. Pat. No. 5,626,098, issued May 6, 1997, is hereby incorporated by reference in its entirety. It should be understood that the invention is not limited to the exact details of construction shown and described herein for obvious modifications will occur to persons skilled in the art.

We claim:

1. A collapsible cage for housing an animal, said collapsible cage having an expanded and a collapsed configuration, said collapsible cage comprising:
   a top platform and a bottom platform defining a ceiling and a floor of said collapsible cage;
   a first accordion wall having a first upper portion and a first lower portion, said first upper portion having a first upper end rotatably engaged to said top platform, said first lower portion having a first lower end rotatably engaged to said bottom platform, and said first upper portion rotatably engaging said first lower portion along a hinge intermediate of said first upper end and said first lower end;
   a second accordion wall having a second upper portion and a second lower portion, said second upper portion having a second upper end rotatably attached to said top platform, said second lower portion having a second lower end rotatably attached to said bottom platform, and said second upper portion rotatably engaging said second lower portion along a hinge intermediate of said second upper end and said second lower end;
   a first end wall rotatably engaging said bottom platform;
   a second end wall rotatably engaging said top platform;
   wherein said top and bottom platforms, first and second end walls, and first and second accordion walls define a cage interior when said collapsible cage has said expanded configuration, and
   wherein during the transition from said expanded configuration to said collapsed configuration said first and second end walls and said first and second accordion walls pivot into said cage interior and said top platform approaches said bottom platform.

2. The collapsible cage of claim 1 wherein a door wall chosen from a group consisting of said first end wall, second end wall, first accordion wall, and second accordion wall, said door wall comprising a door frame defining an entryway through said door wall, and a door rotatably engaging said door frame along a door hinge.

3. The collapsible cage of claim 2 wherein said door wall is said first end wall.

4. The collapsible cage of claim 3 wherein said door rotatably engages said door frame along a door hinge adjacent to said entryway.

5. The collapsible cage of claim 3 wherein said door wall further comprises a latch removably securing said door to said door frame to prevent rotation of said door around said door hinge.

6. The collapsible cage of claim 3 wherein said door wall further comprises a plurality of latches removably securing said door to said door frame to prevent rotation of said door around said door hinge.

7. The collapsible cage of claim 1 wherein said end walls and said accordion walls are of a wire-frame construction.

8. The collapsible cage of claim 7 wherein said top platform and said bottom platform are of a wire-frame construction.

9. A collapsible cage for housing an animal, said collapsible cage having an expanded and a collapsed configuration, said collapsible cage comprising:
   a top platform and a bottom platform defining a ceiling and a floor of said collapsible case;
   a first accordion wall having a first upper portion and a first lower portion, said first upper portion having a first upper end rotatable engaged to said top platform, said first lower portion having a first lower end rotatably engaged to said bottom platform, and said first upper portion rotatable engaging said first lower portion along a hinge intermediate of said first upper end and said first lower end;
   a second accordion wall having a second upper portion and a second lower portion, said second upper portion having a second upper end rotatable attached to said top platform, said second lower portion having a second lower end rotatable attached to said bottom platform, and said second upper portion rotatable engaging said second lower portion alone a hinge intermediate of said second upper end and said second lower end;
   a first end wall rotatable engaging said bottom platform;
   a second end wall rotatably engaging said top platform;
   wherein said top and bottom platforms, first and second end walls, and first and second accordion walls define a cage interior when said collapsible cage has said expanded configuration;

wherein during the transition from said expanded configuration to said collapsed configuration said first and second end walls and said first and second accordion walls pivot into said cage interior and said top platform approaches said bottom platform;

wherein a door wall chosen from a group consisting of said first end wall, second end wall, first accordion wall, and second accordion wall, said door wall comprising a door frame defining an entryway through said door wall, and a door rotatable engaging said door frame along a door hinge;

wherein said door wall is said first end wall;

wherein said door rotatable engages said door frame along said door hinge adjacent to said entryway wherein said door has a securing extension, said door frame has a receiving element, and said rotatable engagement between said door and said door frame permits movement of said door parallel to said door hinge whereby said securing extension may be raised over said receiving element to prevent the accidental opening of said door.

10. A collapsible cage for housing an animal, said collapsible cage having an expanded and a collapsed configuration and defining a cage interior, said collapsible cage comprising:

top and bottom platforms defining the top and bottom of said collapsible cage;

first and second accordion walls each having opposite ends rotatably engaging said top and bottom platforms and hinged at an intermediate position between said opposite ends, to provide for a rotational collapse of said first and second accordion walls against said top and bottom platforms for portable transport of said collapsible cage in said collapsed configuration, and to provide for an expansion of said first and second accordion walls into said expanded configuration for use in housing an animal;

a first end wall rotatably engaging an individual one of the top and bottom platforms to facilitate the collapse of said first and second accordion walls when said first end wall is pivoted into said cage interior;

a second end wall rotatably engaging the individual one of the top and bottom platforms not engaged to said first end wall, to facilitate the collapse of said first and second accordion walls when said second end wall is pivoted into said cage interior.

11. The collapsible cage of claim 10 wherein a door wall chosen from a group consisting of said first end wall, second end wall, first accordion wall, and second accordion wall, said door wall comprising a door frame defining an entryway through said door wall, and a door rotatable engaging said door frame alone a door hinge.

12. The collapsible cage of claim 11 wherein said door wall is said first end wall.

13. The collapsible cage of claim 12 wherein said door rotatably engages said door frame along a door hinge adjacent to said entryway.

14. The collapsible cage of claim 12 wherein said door wall further comprises a latch removably securing said door to said door frame to prevent rotation of said door around said door hinge.

15. The collapsible cage of claim 12 wherein said door wall further comprises a plurality of latches removably securing said door to said door frame to prevent rotation of said door around said door hinge.

16. The collapsible cage of claim 10 wherein said end walls and said accordion walls are of a wire-frame construction.

17. The collapsible cage of claim 16 wherein said top platform and said bottom platform are of a wire-frame construction.

18. A collapsible cage for housing an animal, said collapsible cage having an expanded and a collapsed configuration and defining a cage interior, said collapsible cage comprising:

top and bottom platforms defining the top and bottom of said collapsible cage;

first and second accordion walls each having opposite ends rotatably engaging said top and bottom platforms and hinged at an intermediate position between said opposite ends, to provide for a rotational collapse of said first and second accordion walls against said top and bottom platforms for portable transport of said collapsible cage in said collapsed configuration, and to provide for an expansion of said first and second accordion walls into said expanded configuration for use in housing an animal;

a first end wall rotatable engaging an individual one of the top or bottom platforms to facilitate the collapse of said first and second accordion walls when said first end wall is pivoted in to said cage interior;

a second end wall rotatable engaging the individual one of the top or bottom platforms not engaged to said first end wall, to facilitate the collapse of said first and second accordion walls when said second end wall is pivoted into said cage interior;

wherein the rotatable engagement of said first end wall to an individual one of said top or bottom platforms, combined with the rotatable engagement of said second end wall to the other of said top or bottom platforms, facilitates transformation of the cage into either an expanded or collapsed configuration;

wherein a door wall chosen from a group consisting of said first end wall, second end wall, first accordion wall, and second accordion wall, said door wall comprising a door frame defining an entryway through said door wall, and a door rotatably engaging said door frame along a door hinge;

wherein said door wall is said first end wall;

wherein said door rotatable engages said door frame along said door hinge adjacent to said entryway;

wherein said door has a securing extension, said door frame has a receiving element, and said rotatable engagement between said door and said door frame permits movement of said door parallel to said door hinge whereby said securing extension may be raised over said receiving element to prevent the accidental opening of said door.

* * * * *